W. F. BUTLER.
FISH POSITIONING MACHINE.
APPLICATION FILED OCT. 28, 1916.
1,416,687.
Patented May 23, 1922.
3 SHEETS—SHEET 1.
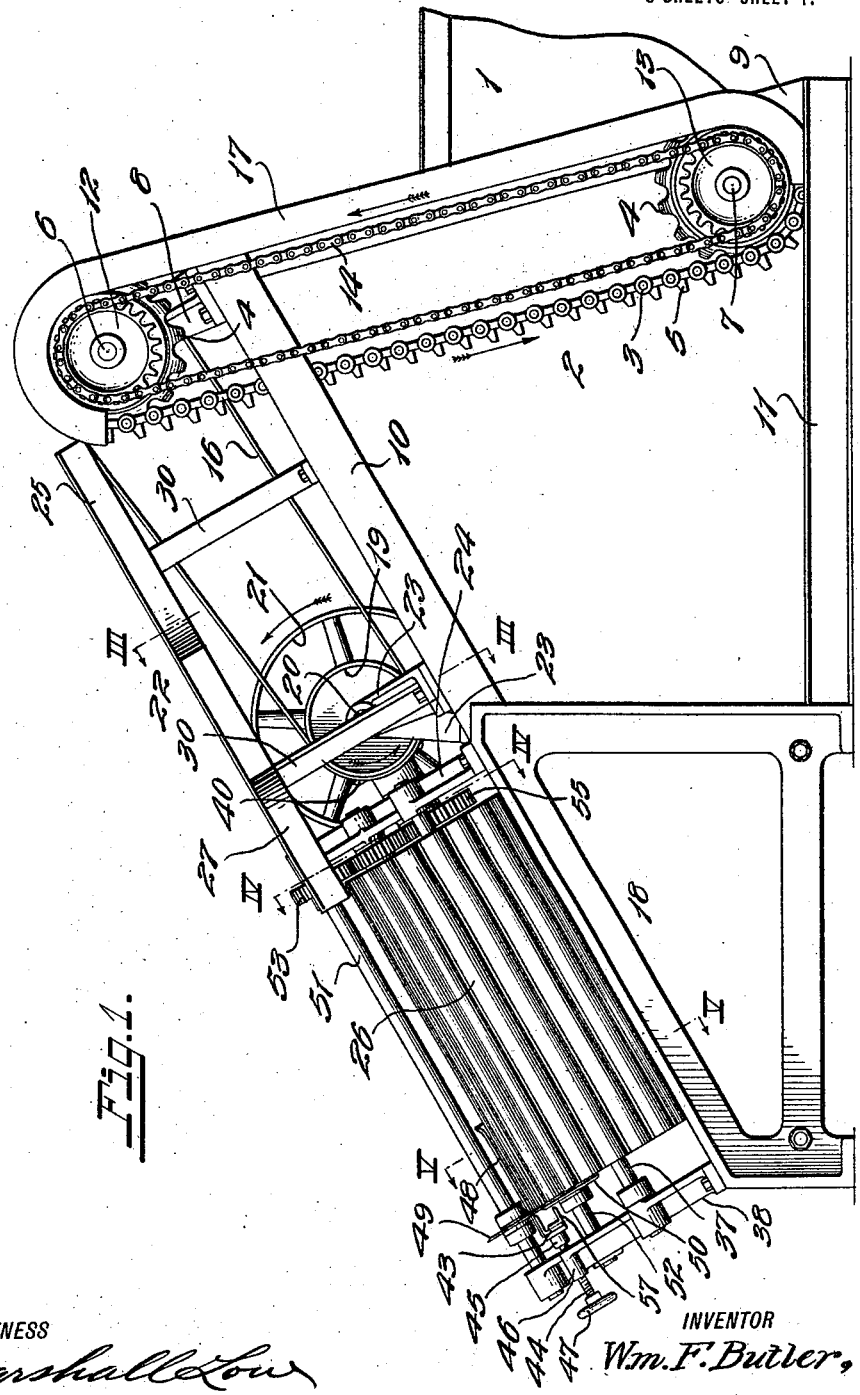
WITNESS
Marshall Low
INVENTOR
Wm. F. Butler,
BY
H. N. Low
ATTORNEY

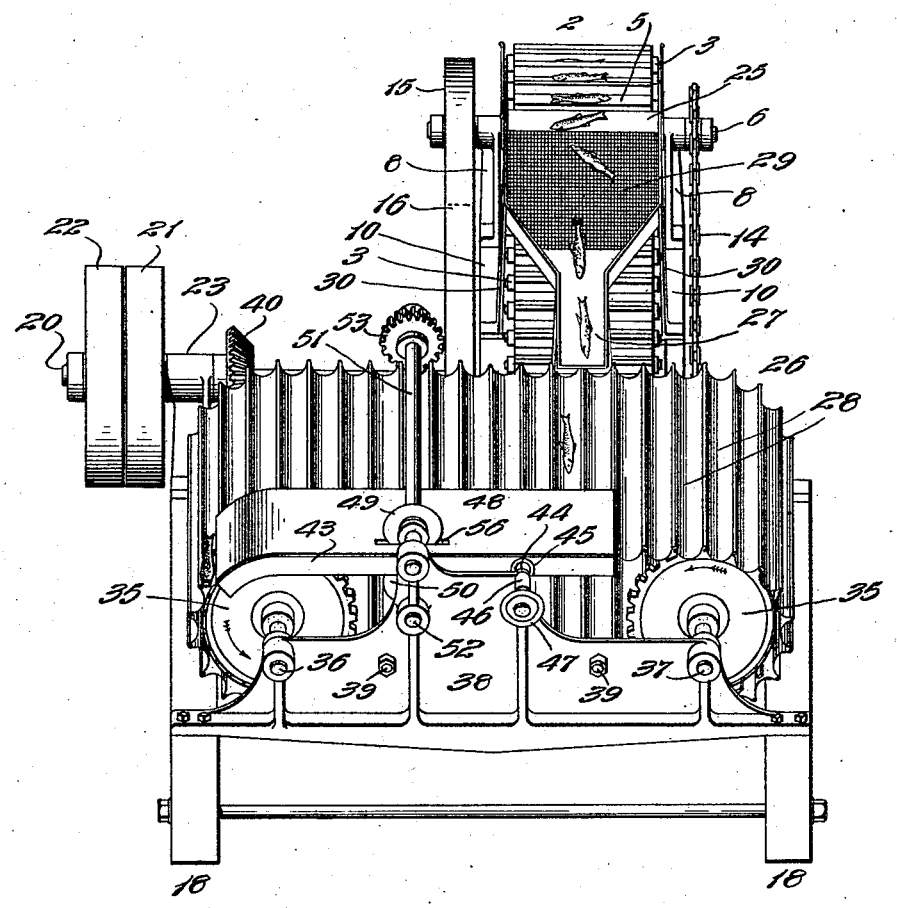

W. F. BUTLER.
FISH POSITIONING MACHINE.
APPLICATION FILED OCT. 28, 1916.
1,416,687.
Patented May 23, 1922.
3 SHEETS—SHEET 3.
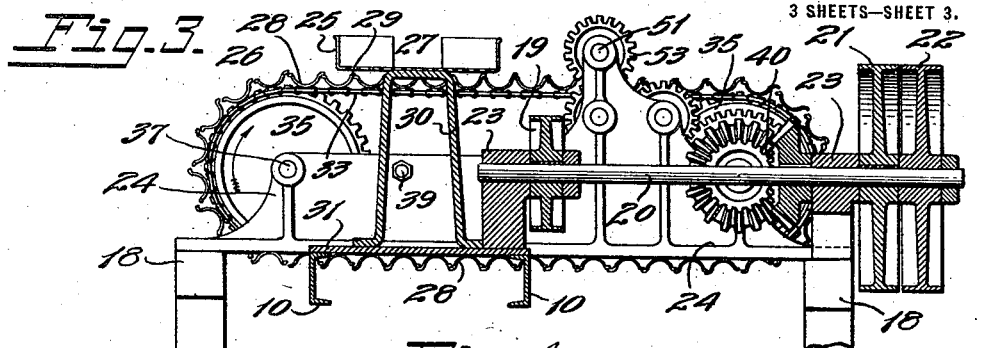
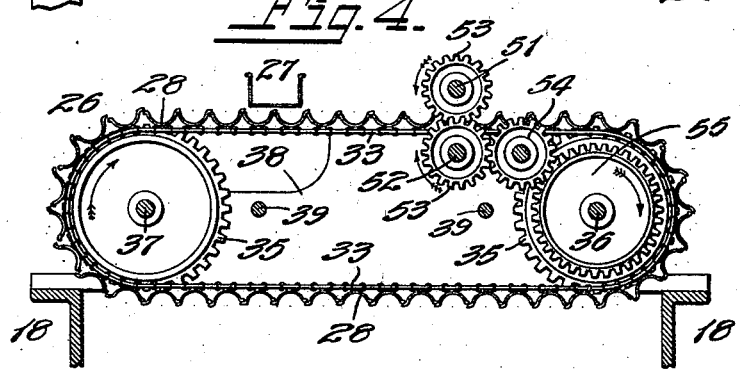
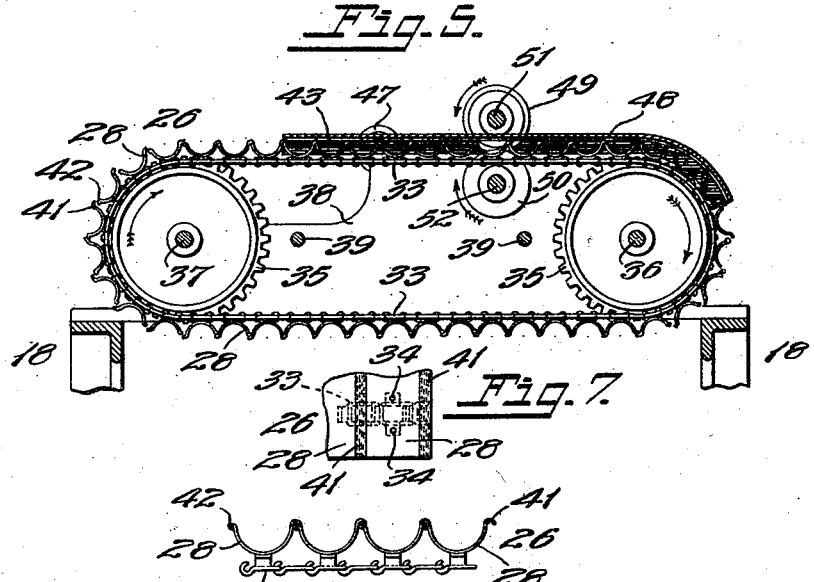
WITNESS
Marshall Low
INVENTOR
Wm. F. Butler,
BY
N. N. Low
ATTORNEY

UNITED STATES PATENT OFFICE.

WILLIAM F. BUTLER, OF FAIRPORT, NEW YORK, ASSIGNOR TO AMERICAN CAN COMPANY, A CORPORATION OF NEW JERSEY.

FISH-POSITIONING MACHINE.

1,416,687.  Specification of Letters Patent.  Patented May 23, 1922.

Application filed October 28, 1916. Serial No. 123,317.

*To all whom it may concern:*

Be it known that I, WILLIAM F. BUTLER, a citizen of the United States, residing at Fairport, in the county of Monroe and State of New York, have invented certain new and useful Improvements in Fish-Positioning Machines, of which the following is a specification.

The invention relates to means for positioning fish, which may be employed for cutting fish, preferably by decapitation, and for other purposes; and has for its object to automatically sort the fish and to perform the desired operation upon them rapidly and accurately; and has for a further object to provide a simple and economical machine for these purposes.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Fig. 1 is a side view, broken away at the right hand end, of a fish positioning and cutting machine embodying the invention.

Fig. 2 is a rear view of the same.

Fig. 3 is a cross section on line III—III of Fig. 1.

Figs. 4 and 5 are similar sections on lines IV—IV and V—V of Fig. 1, respectively.

Fig. 6 is an end view of a portion of the cutting and delivering conveyor, on a larger scale.

Fig. 7 is a detail, in plan view, of the same.

Referring to the drawings, 1 is a hopper arranged at the front of the machine, into which the fish may be delivered from a chute or in any suitable manner. The fish are or may be preliminarily sorted so as to be of an average size, with some variation. The machine will operate successfully and at the same time on fish varying considerably in size, but will do more accurate work and with less waste the more nearly that the fish are of substantially the same average length. 2 is an elevating conveyor the front and upwardly moving limb of which forms the rear wall of the hopper 1, and which comprises a pair of chains 3 running on upper and lower sprockets 4 and having attached thereto elevating flights 5. The spaces between the flights 5 will be filled in with slats, or the conveyor will be otherwise constructed, so that the fish cannot pass through but will be picked up from the hopper by the said flights and elevated thereby, ordinarily one fish on each flight. That part of the conveyor on which the fish are thus received is or may be the central part, which is effected by limiting the width of the rear part of the hopper which is open to the conveyor, it being wide enough to accommodate the longest fish. The sprockets 4 are fixed on upper and lower rotary shafts 6 and 7 mounted on brackets 8 and 9 fixed respectively on inclined frame members 10 and base members 11. The shafts are connected to run in unison, and to take the strain off the elevator, by chain wheels 12, 13 fixed on the said shafts and connected by a chain 14, and the elevator is actuated by a pulley 15 fixed on the shaft 6, and by a belt 16. The front limb of the elevator is enclosed by a guard or casing 17 attached to the frame 10.

The belt 16 is driven by a pulley 19 on a power shaft 20 (Fig. 3), the latter being driven by a shiftable belt (not shown) leading to fast and loose pulleys 21, 22, the same being fixed on the shaft 20. This shaft is mounted in bearings 23 the outer of which is carried by a frame member 18 and the inner of which is carried by a plate 31. Said plate is supported by longitudinal frame members 10 attached to a transverse casting or front frame plate 24, the latter being carried by the frame members 18.

The fish are delivered successively from the top rear part of the elevator 2 (Fig. 2) into an inclined fish-positioning chute 25 which leads rearward and downward and delivers the fish by gravity and head first to the cutting and delivering conveyor 26. The upper part of the chute 25 is sufficiently wide to collect all of the fish which drop from the flights 5, and its lower part 27 is preferably contracted to about the width of two of the fish-receiving concave slides or flights 28 of the conveyer 26 (Fig. 2). The bottom of the upper part of said chute is preferably formed by, or has applied thereto, a wire netting 29 to aid in partly retarding, agitating and turning the fish into the desired head-first-downward position. The chute is supported on brackets 30 from the frame members 10 and from the plate 31.

The fish receiving slides and holders 28 consist of a series of substantially semi-circular and separate strips of sheet metal strong enough to maintain their shape and extending across a pair of endless conveyor chains 33, to the alternate links of which they are riveted at 34 so as to form flights of the conveyor 26 (Fig. 7). The said chains are mounted on two pairs of sprockets 35 fixed on inclined shafts 36, 37 so that the slides 28 are thereby inclined and enabled to further position the fish by gravity. The shafts 36, 37 are mounted in suitable bearings in the front frame plate 24 and in a corresponding rear frame plate 38, said plates being united by bolt rods 39. The shaft 36 is driven by bevel gearing 40 (Fig. 3) from the power shaft 20, so that the conveyor 26 with its slides 28 is driven transversely to the chute 25, 27 in time with the elevator 2, the result being that substantially one fish is received in each slide as it passes the end of the chute. The slides 28 lap alternately over and under each other (Fig. 6) and are loosely jointed together along their longitudinal edges by exterior and interior bends and beads 41, 42, so that the slides may separate slightly as they pass around the shafts 36, 37, as shown, but present a continuous fish-receiving surface at the chute 27.

As the fish are received on the conveyor 26 they contact with surfaces which have no upward or downward movement, as do the surfaces on concave or convex drums whose vertical component of movement is apt to disarrange the fish and prevent them from assuming the parallel and head downward position which is necessary for the decapitating operation, and this displacement of the fish is more likely to occur as the machine is driven at a higher speed. The movement of the fish in my apparatus is substantially a right line movement so that there exists no centrifugal force to act upon the fish, and they enter the conveyer rapidly and smoothly and settle in the channels of the conveyer in the desired manner. The action of the fish in this machine is substantially the same for any speed at which the machine may be driven. The fish slide by gravity down along the concaves thereof until their heads encounter a gauge plate 43 (Figs. 1 and 2). This gauge plate is normally fixed during the operation of the machine and is located a distance to the rear of the lower ends of the slides 28 equal to the average length of the heads of the fish to be decapitated, the gills of the fish being thus located at substantially the lower rear edge of the limb of the conveyor. Preferably the gauge plate 43 is adjustable towards and from the conveyor 26 in order that the proper decapitation of fish of different lengths of head may be accomplished and such adjustment may be effected by one or more screws 44 pivotally connected at 45 with the gauge plate and mounted in a threaded bearing 46 on the plate 38 and provided with a handle 47 by which it may be turned. 48 is a confining or cover plate which holds the fish down in the slides 28 during the cutting operation. This plate is or may be attached to the gauge plate and may conform with and rest on the delivery end of the conveyor 26 (Fig. 2).

49, 50 indicate upper and lower rotary cutters or knives arranged in or near the plane of the rear edge of the conveyor 26 so as to decapitate the fish as the conveyor carries them past the cutters. These cutters are fixed on shafts 51, 52 mounted to turn in the frame plates 24, 38, and having fixed on them intermeshing gear pinions 53 (Fig. 4). One of the pinions is driven by an idler gear 54 from a gear 55 fixed on the shaft 36. A slot 56 is provided for the cutter 49 in the plate 48. The gauge plate 43 may have an inwardly extending bottom flange 57 to support the heads of the fish during the cutting operation, (Fig. 1).

It is to be understood that the combination and invention, in its more general aspects is not limited to the specific construction of the conveyor or of other elements. And the laterally inclined conveyor may be combined and employed with means which operate on the fish, other than a cutting device.

What is claimed is:

1. The combination of a guiding and holding inclined slide for fish consisting of a series of channels, a fish-positioning slide inclined in the same direction as said channels and constructed to deliver fish head first into the upper ends of the channels, and means for moving the series of channels transversely in substantially straight lines across the lower end of said positioning slide.

2. The combination of a guiding and holding inclined slide for fish consisting of a series of channels, a fish-positioning slide inclined in the same direction as said channels and constructed to deliver fish head first into the upper ends of the channels, means for moving the series of channels transversely in substantially straight lines across the lower end of said positioning slide, means at the lower ends of said channels for gauging the heads of the fish, and decapitating means.

3. The combination of a guiding and holding inclined slide for fish consisting of an endless series of channels, a fish-positioning slide inclined in the same direction as said channels and constructed to deliver fish head first into the upper ends of the channels, means for maintaining and moving the series of channels transversely in substantially straight lines across the lower end of said positioning slide, means at the lower ends of said channels for gauging the heads of the fish, and decapitating means.

4. The combination of a guiding and holding inclined slide for fish consisting of a series of channels having flexible connections with each other, a fish-positioning slide inclined in the same direction as said channels and constructed to deliver fish head first into the upper ends of the channels, means for moving the series of channels transversely in substantially straight lines across the lower end of said positioning slide, means at the lower end of said channels for gauging the heads of the fish, and decapitating means.

5. The combination of a guiding and holding inclined slide for fish consisting of a flexible carrier having a series of channels, a fish-positioning slide inclined in the same direction as said channels and constructed to deliver fish head first into the upper ends of the channels, means for maintaining a limb of the carrier transversely in substantially straight lines across the lower end of said positioning slide, means at the lower ends of said channels for gauging the heads of the fish, decapitating means, and actuating mechanism.

6. In a fish-positioning and conveying machine, the combination of an inclined, flat fish-positioning slide constructed to position fish head first thereon, and a conveyer constructed and cooperating with said slide to receive fish head-first from the same and having means to space the fish and propel them sidewise, said conveyer having its operating surface substantially in a plane inclined in the same direction as said slide.

7. The combination of an inclined fish-positioning slide constructed to position and deliver fish head first from its lower end, a conveyer having its operating surface arranged in substantially the same plane as said slide, and means for operating the conveyer in said plane and transversely to the slide.

In testimony whereof I affix my signature.
WILLIAM F. BUTLER.

Witnesses:
D. F. MENNIS,
C. W. GRAHAM.